(12) United States Patent
Marya et al.

(10) Patent No.: US 11,965,398 B2
(45) Date of Patent: Apr. 23, 2024

(54) WEAR RESISTANT SELF-LUBRICATING ADDITIVE MANUFACTURING PARTS AND PART FEATURES

(71) Applicant: Schlumberger Technology Corporation, Sugar Land, TX (US)

(72) Inventors: Manuel Marya, Sugar Land, TX (US); Srinand Karuppoor, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 385 days.

(21) Appl. No.: 16/454,793

(22) Filed: Jun. 27, 2019

(65) Prior Publication Data

US 2020/0406357 A1    Dec. 31, 2020

(51) Int. Cl.
| | |
|---|---|
| *E21B 4/02* | (2006.01) |
| *B22F 5/00* | (2006.01) |
| *B22F 10/25* | (2021.01) |
| *B22F 10/30* | (2021.01) |
| *B33Y 50/02* | (2015.01) |
| *B33Y 70/00* | (2020.01) |
| *B33Y 80/00* | (2015.01) |
| *E21B 4/00* | (2006.01) |
| *B22F 10/14* | (2021.01) |

(52) U.S. Cl.
CPC ............... *E21B 4/02* (2013.01); *B22F 10/25* (2021.01); *B22F 10/30* (2021.01); *B33Y 50/02* (2014.12); *E21B 4/003* (2013.01); *B22F 2005/002* (2013.01); *B22F 10/14* (2021.01); *B22F 2301/10* (2013.01); *B22F 2302/05* (2013.01); *B22F 2302/20* (2013.01); *B22F 2302/406* (2013.01); *B33Y 70/00* (2014.12); *B33Y 80/00* (2014.12)

(58) Field of Classification Search
CPC ..... B33Y 50/02; B33Y 10/00; B22F 2302/10; B22F 2301/10; B22F 2302/05; B22F 2302/105; B22F 2302/25; B22F 2302/253; B22F 2302/256; B22F 2302/406; E21B 10/54
See application file for complete search history.

(56) References Cited

U.S. PATENT DOCUMENTS

| | | | |
|---|---|---|---|
| 3,929,432 A | 12/1975 | Caveney | |
| 4,052,204 A | 10/1977 | Plewes | |
| 4,260,432 A | 4/1981 | Plewes | |
| 4,641,976 A * | 2/1987 | Kar | C22C 9/00 175/371 |

(Continued)

FOREIGN PATENT DOCUMENTS

| | | | | |
|---|---|---|---|---|
| CN | 107541613 A | * | 1/2018 | |
| DE | 19643379 A1 | * | 6/1997 | B22D 21/025 |
| JP | 03236432 A | * | 10/1991 | |

OTHER PUBLICATIONS

DE 19643379 machine translation (Year: 1997).*

(Continued)

*Primary Examiner* — Paul A Wartalowicz
*Assistant Examiner* — Stephani Hill
(74) *Attorney, Agent, or Firm* — Jeffrey D. Frantz

(57) ABSTRACT

Wear resistant self-lubricating additive manufacturing parts and part features are disclosed in use with oilfield service operations.

6 Claims, 2 Drawing Sheets

(56) References Cited

U.S. PATENT DOCUMENTS

| | | | | |
|---|---|---|---|---|
| 4,818,307 | A | * | 4/1989 | Mori .................... B23K 35/302 |
| | | | | 148/414 |
| 4,832,982 | A | * | 5/1989 | Mori ...................... B22F 10/20 |
| | | | | 427/597 |
| 5,132,083 | A | * | 7/1992 | Takeda ...................... C22C 9/06 |
| | | | | 420/490 |
| 2011/0042145 | A1 | * | 2/2011 | Xia ........................... C23C 4/18 |
| | | | | 175/374 |
| 2016/0053349 | A1 | * | 2/2016 | Nielsen, Jr. ............... C22F 1/08 |
| | | | | 148/707 |
| 2017/0050241 | A1 | * | 2/2017 | Thomas ................. B33Y 40/00 |
| 2018/0311736 | A1 | * | 11/2018 | Pawlikowski ...... C22C 32/0021 |
| 2019/0375072 | A1 | * | 12/2019 | Rifaut ..................... B24D 5/02 |

OTHER PUBLICATIONS

Wu et al. Direct manufacturing of Cu-based alloy parts by selective laser melting. Chinese Optics Letter. Jan. 10, 2007. Nol. 5, No. 1. 37-40. (Year: 2007).*

Agarawala et al. Structurally Sound Metal Parts by Selective Laser Sintering. 1994 EPD Congress Proceedings of a Symposium sponsored by the Extraction and Processing Division, TMS Annual Meeting, 833-851. (Year: 1994).*

ASM Specialty Handbook. Copper and Copper Alloys. ASM International. 2001. Standard Designations for Wrought and Cast Copper and Copper Alloys. pp. 14-30. (Year: 2001).*

JP H03-236432 machine translation (Year: 1991).*

CN 107541613 machine translation (Year: 2018).*

Kang, et al., "Preparation of copper-diamond composites with chromium carbide coatings on diamond particles for heat sink applications," Applied Thermal Engineering, vol. 60, Issue 1-2, Oct. 2, 2013, pp. 423-429.

Schlumberger, "Antiballing Coating," retrieved on Jun. 10, 2019 at https://www.slb.com/services/drilling/drill_bits/type/pdc_bits/lyng_pdc_bits/antiballing_coating.aspx.

"Hardening of Copper Alloys," retrieved on Jun. 10, 2019 at http://www.totalmateria.com/Article71.htm.

"Thermal Treatments (Heat-Treating)," retrieved on Jun. 10, 2019 at https://www.nde-ed.org/EducationResources/CommunityCollege/Materials/Structure/thermal.htm.

* cited by examiner

WEAR RESISTANT SELF-LUBRICATING ADDITIVE MANUFACTURING PARTS AND PART FEATURES

CROSS-REFERENCE TO RELATED APPLICATIONS

None.

STATEMENT REGARDING FEDERALLY SPONSORED RESEARCH OR DEVELOPMENT

None.

FIELD OF THE DISCLOSURE

Aspects of the disclosure relate to oil field services. More specifically, aspects of the disclosure relate to wear resistant self-lubricating parts and part features used in oil field services.

BACKGROUND INFORMATION

Improving wear resistance against particles and fluid flow often requires the use of hard materials such as tungsten carbide as well as the use of nickel as a binder. Lubrication and heat extraction are important properties for such materials and are not addressed in oil field service work or components used in such work. The reasons for not addressing lubrication and heat extraction is due to unavailability of optimal combinations of metal binder, ceramic components and differing manufacturing processes. In the instance of rotating equipment parts such as bearings, bushings, thrust washers, cutters, rotors, stators, mixers, gears, cams, pump stages as well as other non-rotating equipment such as wear bands, pads, stabilizers and centralizers, the use of certain types of materials can be very limiting and the choice of an incorrect material may hamper the overall design.

In instances where wear resistance against particles and fluid flow is an important asset, conventional parts have a tendency to wear and/or break, thereby limiting the overall economic effectiveness of their use.

There is a need to provide improved wear resistance components used in oilfield service work.

There is an additional need to provide improved wear resistance components that are economical for use by manufacturers.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method is disclosed comprising inputting a design for an oil field service component into a computing arrangement. The method further provides for developing an additive manufacturing construction technique for the component, wherein the construction technique is to use at least one of a copper-based alloy responsive to heat treatment and at least one ceramic, the additive manufacturing construction technique combining the at least one copper based alloy and the at least one ceramic. The method further provides for constructing the component using the developed additive manufacturing construction technique using the at least one copper-based alloy and the at least one ceramic.

In another non-limiting embodiment, an article of manufacture is disclosed comprising a component used in the recovery of hydrocarbons, wherein the component has a body made by an additive manufacturing technique with at least one alloy and at least one ceramic, wherein the alloy contains at least one of a group 2, group 3 to 10 and group 12 to 15 periodic table element.

In another non-limiting embodiment, a non-transitory computer readable medium storing a program causing a computer to execute a process is disclosed. The non-transitory computer readable medium comprises inputting a design for an oil field service component into a computing arrangement. The program executed by the non-transitory computer readable medium may also provide for developing an additive manufacturing construction technique for the component, wherein the construction technique is to use at least one of a copper-based alloy responsive to heat treatment and at least one ceramic, the additive manufacturing construction technique combining the at least one copper based alloy and the at least one ceramic. The program executed by the non-transitory computer readable medium may also provide for constructing the component using the developed additive manufacturing construction technique using the at least one copper-based alloy and the at least one ceramic.

Other aspects and advantages will become apparent from the following description and the attached claims.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope for the disclosure may admit to other equally effective embodiments.

Figure 1:
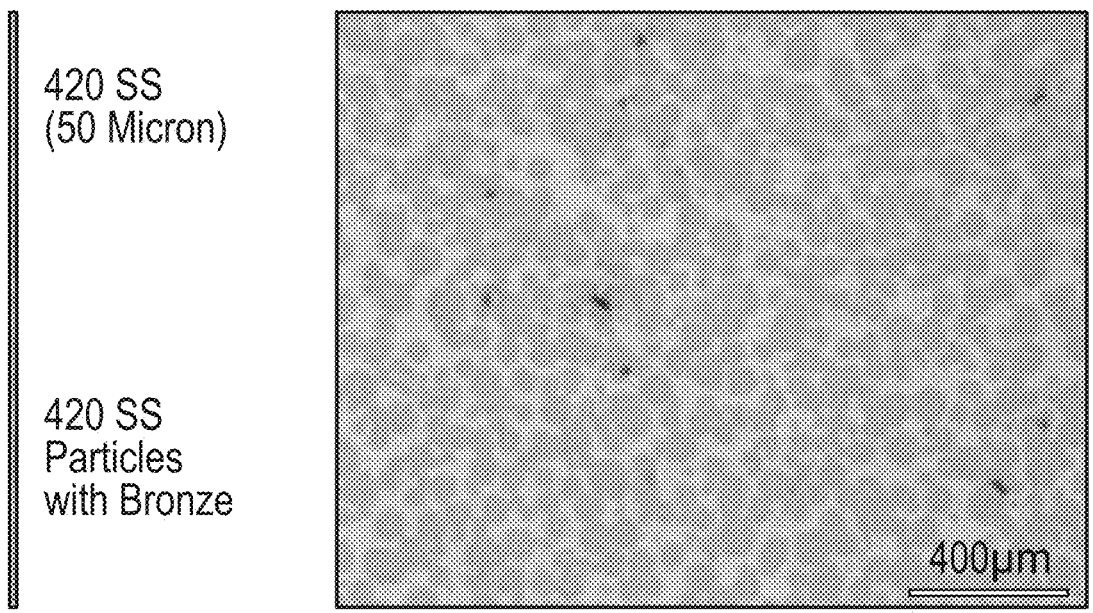
FIG. 1 is an electron microscope scan of a 420ss matrix with a bronze infiltrate.

To facilitate understanding, identical reference numerals have been used, wherein possible, to designate identical elements that are common to the figures ("FIGS."). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc. may be used to describe various elements, components, regions, layers and/or sections, these elements, components, regions, layers and/or sections should not be limited by these terms. These terms may be used only to distinguish one element, component, region, layer or section. Terms such as "first", "second" and other numerical terms when used herein do not imply a sequence or Order unless clearly indicated by the context. Thus, a first element, component, region, layer or section without departing from the teachings of the example embodiments.

When an element or layer is referred to as being "on," "engaged to," "connected to," or "coupled" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes an and all combinations of one or more of the associated listed terms.

Some embodiments will not be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above and below a given point are used in this description to more clearly describe certain embodiments.

Aspects of the disclosure provide for materials for additive manufacturing products used in oil field service work. In aspects of the disclosure, materials may have high hardness for high abrasive wear resistance. In other embodiments, high erosion resistance is provided having high tensile properties including elongation and toughness and a good response to plastic deformation. The embodiments described may be used to prevent wear, or resist wear, under certain environments.

Activities in downhole environments are notoriously challenging for materials, and as such, selection of materials placed in these environments are chosen with great care. Despite this care, conventional material selections challenge designers of downhole components. Materials used in downhole environments are often compromised in yield strength, bending and sheer as the environment has high temperatures and pressures, mixed with high rotation speeds that causes deleterious effects on the materials.

Other aspects of the disclosure provide for a high thermal conductivity to evacuate potential head accumulation, thus keeping the material locally cooled and preventing decrease in mechanical properties. For example, melting temperatures are kept at relatively low values to provide reduced thermal distortion during processing, to achieve a minimization of part distortion.

In other example embodiments, a high thermal resistance is achieved where frictional heat may be elevated, such as bearings under high contact stress or cutting tools against rock formations. In further example embodiments, very low friction coefficients for high anti-galling resistance is maintained. In embodiments, the materials used are compatible with ceramic components, like aluminum bronzes of different percentage types, nickel aluminum bronzes, high leaded tin bronzes as non-limiting embodiments.

In non-limiting embodiments, aspects of the disclosure provide not only for use of certain elements and alloys for constructing components, but also using these elements and alloys in an additive manufacturing context. The use of additive manufacturing techniques adds complexity to the construction of components, but allows for intricate components to be manufactured to more precise requirements. In embodiments described below, different embodiments of elements and alloys and combinations of these elements and alloys are described for use with additive manufacturing processes such that the desired output, oil field service parts, provide final products that are superior to conventional manufacturing products.

In one such non-limiting embodiment, metal binders are used in an additive manufacturing context, to provide for precipitation hardening copper alloys such as beryllium coppers (C1700, C17200, C17500), which may or may not contain nickel, cobalt or chromium; copper-chromium alloys (C18200, C18400, C18500) copper-zirconium alloys (C1500); the copper-nickel-silicon alloys and the copper-nickel-phosphorus C19000 alloys. All precipitation hardening copper alloys may have similar metallurgical characteristics; i.e. the alloys can be solution treated to a soft condition by quenching from a high temperature, and then subsequently, precipitation hardened by aging at a moderate temperature for a time usually not exceeding three (3) hours.

Other alloys that may be used in non-limiting embodiments include spinodal copper alloys such as CuNiSn alloys (26-36 HRC, such as C96970, C96900), in addition to alloys discussed below Precipitation Hardening

| PRECIPITATION HARDENING | | | | |
|---|---|---|---|---|
| | Solution Treating | Ageing Treatment Temperature, Time | | |
| Alloy | Temperature | C. | H | Hardness |
| C15000 | 980 | 500-550 | 3 | 30 HRC |
| C17000, C17200, C17300 | 760-800 | 300-350 | 1-3 | 35-44 HRC |
| C17500, C17600 | 900-950 | 455-490 | 1-4 | 95-98 HRC |
| C18000 (b), C81540 | 900-930 | 425-540 | 2-3 | 92-96 HRB |
| C18200, C18400, C18500, C81500 | 980-1000 | 425-500 | 2-4 | 68 HRB |

-continued

PRECIPITATION HARDENING

| Alloy | Solution Treating Temperature | Ageing Treatment Temperature, Time C. | H | Hardness |
|---|---|---|---|---|
| C94700 | 775-800 | 305-325 | 5 | 180 HB |
| C99400 | 885 | 482 | 1 | 170 HB |

Spinodal Hardening

SPINODAL HARDENING

| All | Solution Treating Temperature | Ageing Treatment Temperature, Time C. | H | Hardness |
|---|---|---|---|---|
| C71900 | 900-950 | 425-760 | 1-2 | 86 HRC |
| C72800 | 815-845 | 350-360 | 4 | 32 HRC |

Other materials may be used in construction of components for the downhole environment. These may include the following non-limiting materials listed.

| Alloy | 25 | 174 | ToughMet 3 | 360 | 1915/1916 |
|---|---|---|---|---|---|
| UNS Number | C17200 | C17410 | C72900 | N03360 | C19150 |
| ISO/EN Designation | CuBe2 | CiCp0.5Be0.3 | CuNi15Sn8 | NiBe2 | CuNi1Pb1P |
| Yield Strength (ksi) | 145-200 | 80-120 | 90-150 min | 100-245 | 65-100 |
| Tensile Strength (ksi) | 165-255 | 95-130 | 110-160 min | 155-290 | 70-105 |
| Elongation in 2" | 2-10% | 7-20% | 3-15% min | 8-14% min | 4-30% |
| Modulus of Elasticity (Mpsi) | 19 | 20 | 21 | 28-30 | 18 |
| Electrical Conductivity (% IACS) | 25-30 | 45-60 | 7 | 5 min | 45 |

| Alloy | UTS (ksi) | YS (ksi) | Elongation (%) | Hardness |
|---|---|---|---|---|
| C67300 manganese bronze | 65-85 | 45-60 | 37-19 | HRB 65-90 |
| C93200 Leaded SnBr | 30-35 | 14-20 | 20-10 | <HRB 65 |
| C6300 Aluminum bronze | 100-118 | 50-75 | 20-15 | HRB 96-98 |
| C95400 Ampco | 90 | 36 | 14 | HRB 87 |

Conventional products made for oil and gas production use tungsten carbide with cobalt and/or nickel binders. In aspects of the disclosure, contrary to the conventional technologies, aspects of the disclosure use additive manufacturing with novel compositions including copper, hard reinforcing agents and a variety of ceramics, which may include diamonds.

In non-limiting embodiments, differing ceramic materials may be used. Ceramics that may be used include oxides such as zirconia, alumina and magnesia. Alumina ceramics, such as $\alpha$-$Al_2O_3$ may be used to provide high insulation capability, strength, wear resistance and chemical resistance. In the case of use of zirconia as the ceramic, toughness is added to parts. Nitrides may also be added to increase thermal shock resistance and the added benefit of strength that does not deteriorate with increasing temperatures. Typical nitrides that may be used include silicon nitride or aluminum nitride. In one non-limiting embodiment, silicon nitride ($SI_3N_4$) may be used in pump parts.

In non-limiting embodiments, carbides may be used to retain high strength at temperatures as well as exhibit corrosion resistance. Such uses may include seals and pump parts. Tungsten carbide may be used for high wear applications due to high hardness. Other carbides include $V_4C_3$, $Nb_4C_3$, $Ta_4C_3$, $Cr_{23}C_6$, $Cr_7C_3$, $Cr_3C_2$ and $Mo_3C$.

In other non-limiting embodiments, borides may be used. Borides may be used where high hardness is required. A non-limiting list of borides is provided below:

| | Density ($g/cm^3$) | Melting Point (° C.) | Electrical resistivity ($10^8$ Ohm m) | Knoop hardness (0.1 kp) |
|---|---|---|---|---|
| TiB2 | 4.38 | 3225 | 9-15 | 2600 |
| ZrB$_2$ | 6.17 | 3050 | 7-10 | 1830 |
| HfB2 | 11.2 | 3650 | 10-12 | 2160 |

-continued

| | Density ($g/cm^3$) | Melting Point (° C.) | Electrical resistivity ($10^8$ Ohm m) | Knoop hardness (0.1 kp) |
|---|---|---|---|---|
| VB$_2$ | 5.1 | 2450 | 16-38 | 2110 |
| NbB | 7.5 | 2270 | — | — |
| NbB$_2$ | 6.97 | 3050 | 12-65 | 2130 |
| TaB | 14.2 | 2040 | — | — |
| TaB2 | 11.2 | 3100 | 14-68 | 2500 |
| CrB$_2$ | 5.2 | 2170 | 21-56 | 1100 |
| Mo$_2$B$_5$ | 7.48 | 2370 | 18-45 | 2180 |
| W2B5 | 14.8 | 2370 | 21-56 | 2500 |
| Fe2B | 7.3 | 1389 | — | 1800 |
| FeB | 7 | 1658 | 30 | 1900 |
| CoB | 7.25 | 1460 | 26 | 2350 |
| Co$_2$B | 8.1 | 1280 | — | — |
| NiB | 7.13 | 1034 | 23 | — |
| Ni$_2$B | 7.9 | 1125 | — | — |
| LaB6 | 6.15 | 2715 | 15 | 2010 |
| UB$_4$ | 9.32 | 2530 | 30 | 1850 |

In other embodiments, purified carbon, diamonds, may be used in high wear areas. Such applications may include drill bits. Use of diamonds in this capacity allows for very high thermal conductivity.

In non-limiting embodiments, direct energy deposition may be used in the manufacturing of parts used in one non-limiting example embodiment. Direct energy deposition is defined as a group of processes wherein material is directly deposited on a final location in a product. The process includes jetting the building material into a heated zone. The heated zone may be created, in non-limiting embodiments, through a laser, electron beam or an ionized gas. In other embodiments, the materials jetted into the final position may be changed during the process. In the direct energy deposition methods, materials placed during the manufacturing process are melted as the materials are deposited by a focused thermal energy. A focused thermal energy is an energy source that is focused to melt the materials being deposited.

In non-limiting embodiments, the materials used for deposition may be a ceramic and metal mixture, where the laser or energy source melts the metal matrix and fuses the ceramic particulate resulting in a fused ceramic metal matrix combination. As will be understood, the ratio of ceramic to metal powders may be varied.

In another non-limiting embodiment, a binder jetting process may be used to fabricate components. Binder jetting is an additive manufacturing process wherein a liquid bonding agent is selectively deposited through print nozzles to join powder materials in a powder bed to create a solid part.

In the example embodiment, binder jet technology dispenses the binder via a printing head. With other powder bed systems, once a layer is completed the bed drops incrementally and a roller or blade smoothes a desired layer of powder over the bed surface. Then, the jet selectively sprays the binder over this surface, thus fusing with the previously laid layer.

When used for metallic materials, the base material may be, in a non-limiting embodiment, a metal powder. The metal powder may be 420SS or other ceramic. The binder fuses this material to form a "green part". This green part is infused with an infiltrant or matrix material, typically bronze or other common copper-based material. The material may have a lower melting point that infiltrates into spaces or voids left by the binder when the binder is burned off in a vacuum oven. The binder content determines the amount of void remaining for the infiltrant and can be selectively controlled. The binder content can be varied within a part selectively to tailor the infiltrant to ceramic particles. The resulting part is a metal/ceramic matrix material with the chosen infiltrant as illustrated in FIG. 1. As presented, with a metal powder 420SS, at a 50 micron resolution, a 420 SS is illustrated with interspersed bronze particles.

In another non-limiting embodiment, a material jetting process may be used to fabricate components. Material jetting is an additive manufacturing process wherein a material along with a bonding agent is selectively deposited through print nozzles to build up a solid part.

The material could be a combination of metal/ceramic and eventual metallic binder. The liquid binder is used for initially fusing of the material that is eventually burnt away during the sintering process. In some non-limiting embodiments, different types of ceramics may be used, including carbon diamonds, any non-metallic ceramic particles that may have a metallizing coating or layer for enhanced bonding to a heat treatable copy alloy binder.

Figure 2:
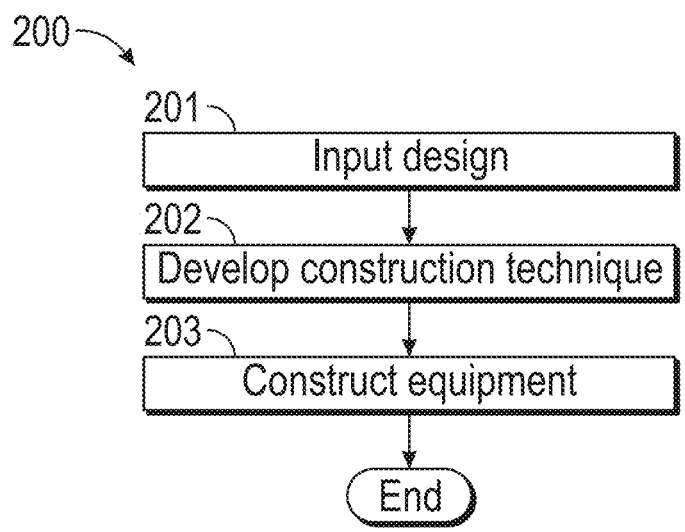
FIG. 2 is a method in conformance with an example embodiment of the disclosure.

Referring to FIG. 2, a method 200 is presented. At 201, the method proceeds with inputting a design for an oil field service component into a computing arrangement is disclosed. At 202, the method proceeds with developing an additive manufacturing construction technique for the component, wherein the construction technique is to use at least one of a copper-based alloy responsive to heat treatment and at least one ceramic, the additive manufacturing construction technique combining the at least one copper based alloy and the at least one ceramic. At 203, the method may proceed with constructing the component using the developed additive manufacturing construction technique using the at least one copper-based alloy and the at least one ceramic. As will be understood, the development of the additive manufacturing construction technique may be performed by a computer arrangement designed to perform such tasks. In non-limiting embodiments, a central processing unit, random access memory and input-output systems may be used. In other non-limiting embodiments, an application specific integrated circuit ("ASIC") may be used to perform computations for production of the component. As will be understood, the components may be bearings, bushings, thrust washers, trines, cutters, rotors, stators, blenders, mixers, gears, camps pump stages, shafts and sleeves as non-limiting embodiments.

In other non-limiting embodiments, other non-rotating equipment may be constructed, such as wear bands, pads, stabilizers, seals, inserts, mandrels, anchors, housings, connectors, ferrules, pins and nozzles, as non-limiting embodiments.

Figure 3:
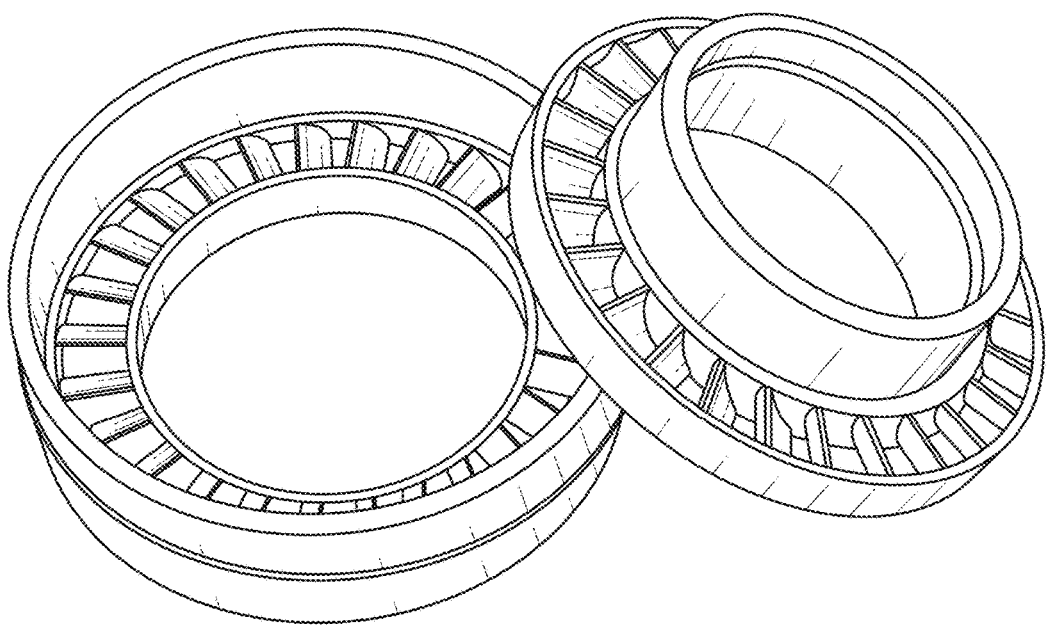
FIG. 3 is a diagram of a rotor and stator for oil field service work constructed using an example embodiment of the disclosure.
Figure 4:
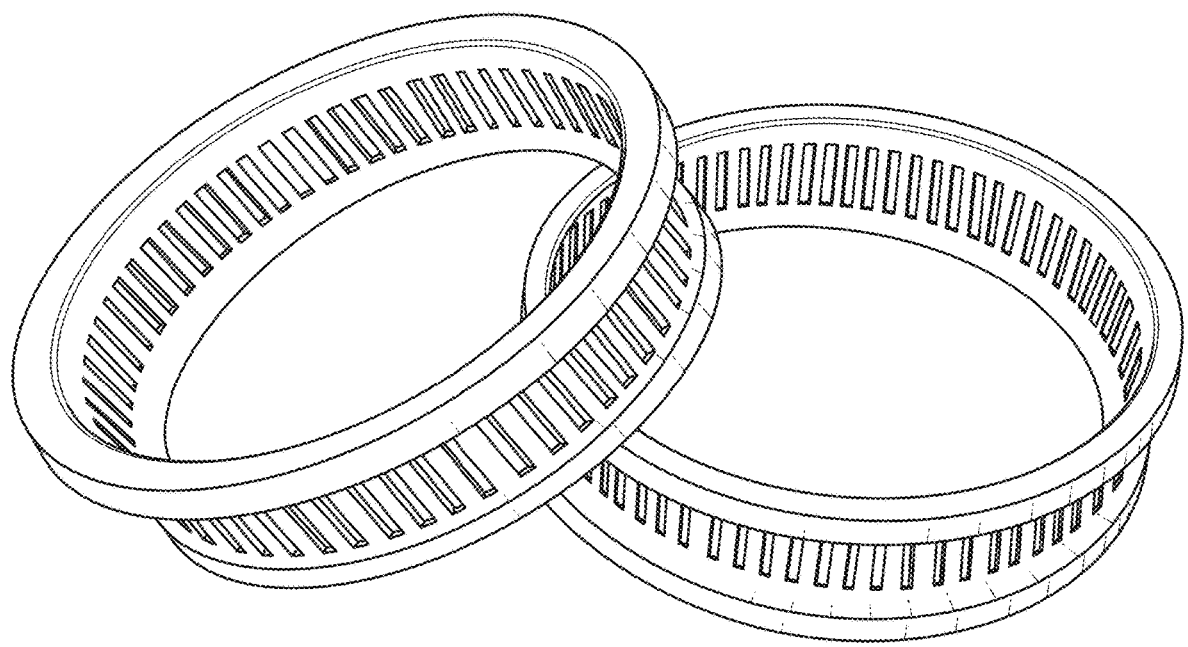
FIG. 4 is a diagram of a filter screen for oil field service work constructed using an example embodiment of the disclosure.

Referring to FIG. 3, a rotor and stator manufactured through the method described are presented. Referring to FIG. 4, fiber screens using binder jet technology for construction are illustrated.

The foregoing description of the embodiments has been provided for the purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

In one non-limiting embodiment, a method is described comprising inputting a design for an oil field service component into a computing arrangement, developing an additive manufacturing construction technique for the component, wherein the construction technique is to use at least one of a copper-based alloy responsive to heat treatment and at least one ceramic, the additive manufacturing construction technique combining the at least one copper based alloy and the at least one ceramic, and constructing the component using the developed additive manufacturing construction technique using the at least one copper-based alloy and the at least one ceramic.

In another non-limiting embodiment, the method may performed wherein the at least one ceramic includes at least one of a carbide, a boride, a nitride and oxide and diamond.

In another non-limiting embodiment, the method may be performed wherein the carbide is a carbide of tungsten, tantalum, chromium, niobium and vanadium.

In another non-limiting embodiment, the method may be performed wherein the boride is a boride of tungsten, titanium and tantalum.

In another non-limiting embodiment, the method may be performed wherein the nitride is a nitride of silicon.

In another non-limiting embodiment, the method may be performed wherein the oxide is an oxide of aluminum, magnesium and titanium.

In another non-limiting embodiment, the method may be performed wherein the copper alloy contains an alkaline earth metal.

In another non-limiting embodiment, the method may be performed wherein the copper alloy contains a transition metal from an element selected from group 3 to 10 of periodic table elements.

In another non-limiting embodiment, the method may be performed wherein the copper-based alloy contains one of a precipitation hardened alloy and a spinodal alloy.

In another non-limiting embodiment, the method may be performed wherein the copper-based alloy has one of Sn, Sb, In, Bi, Pb and Ga up to 2 weight percent.

In another non-limiting embodiment, an article of manufacture is disclosed. The article comprises a component used in the recovery of hydrocarbons, wherein the component has a body made by an additive manufacturing technique with at least one alloy and at least one ceramic, wherein the alloy contains at least one of a group 2, group 3 to 10 and group 12 to 15 periodic table element.

In another non-limiting embodiment, the article of manufacture may be comprised wherein the group 2 element is at least one of beryllium, magnesium, calcium, strontium and barium.

In another non-limiting embodiment, the article of manufacture may be comprised wherein the group 3 element used in the component has a 10 percent by weight solid solubility in copper.

In another non-limiting embodiment, the article of manufacture may be comprised wherein the group 3 element is one of niobium and manganese.

In a non-limiting embodiment, a non-transitory computer readable medium storing a program causing a computer to execute a process is disclosed comprising inputting a design for an oil field service component into a computing arrangement, developing an additive manufacturing construction technique for the component, wherein the construction technique is to use at least one of a copper-based alloy responsive to heat treatment and at least one ceramic, the additive manufacturing construction technique combining the at least one copper based alloy and the at least one ceramic and constructing the component using the developed additive manufacturing construction technique using the at least one copper-based alloy and the at least one ceramic.

In another non-limiting embodiment, the non-transitory computer readable medium may be provided wherein the at least one ceramic includes at least one of a carbide, a boride, a nitride and oxide and diamond.

In another non-limiting embodiment, the non-transitory computer readable medium is provided wherein the carbide is a carbide of tungsten, tantalum, chromium, niobium and vanadium.

In another non-limiting embodiment, the non-transitory computer readable medium is provided wherein the boride is a boride of tungsten, titanium and tantalum.

In another non-limiting embodiment, the non-transitory computer readable medium is provided wherein the nitride is a nitride of silicon.

In another non-limiting embodiment, the non-transitory computer readable medium is provided wherein the copper-based alloy is an alkaline earth metal.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited in the description of the embodiments described herein.

What is claimed is:

1. A method, comprising:
   inputting a design for an oil field service component into a computing arrangement;
   developing an additive manufacturing construction technique for the oil field service component, wherein the additive manufacturing construction technique is to use a modified C19150 copper alloy responsive to heat treatment and at least one ceramic, wherein the modified C19150 copper alloy is a C19150 copper alloy composition that further contains an alkaline earth metal, and wherein the additive manufacturing construction technique comprises combining the modified C19150 copper alloy and the at least one ceramic; and
   constructing the oil field service component using the developed additive manufacturing construction technique using the modified C19150 copper alloy and the at least one ceramic, wherein the at least one ceramic includes at least one of a carbide, a boride, a nitride, an oxide and a diamond.

2. The method according to claim 1, wherein the carbide is a carbide of one of tungsten, tantalum, chromium, niobium and vanadium.

3. The method according to claim 1, wherein the boride is a boride of one of tungsten, titanium and tantalum.

4. The method according to claim 1, wherein the nitride is a nitride of silicon.

5. The method according to claim 1, wherein the oxide is one of an oxide of aluminum, magnesium and titanium.

6. The method according to claim 1, wherein the modified C19150 copper alloy is a precipitation hardened alloy.

* * * * *